Figure 1:
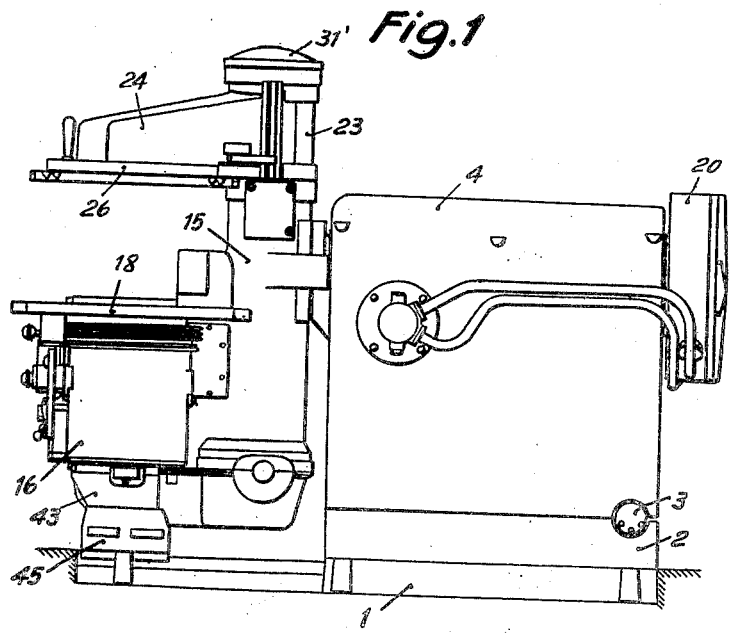

Sept. 22, 1953    E. MEZGER    2,652,608
VIBRATION MOLDING MACHINE
Filed Jan. 10, 1950    4 Sheets-Sheet 1

INVENTOR.
Edward Mezger
BY

Sept. 22, 1953  E. MEZGER  2,652,608
VIBRATION MOLDING MACHINE
Filed Jan. 10, 1950  4 Sheets-Sheet 2
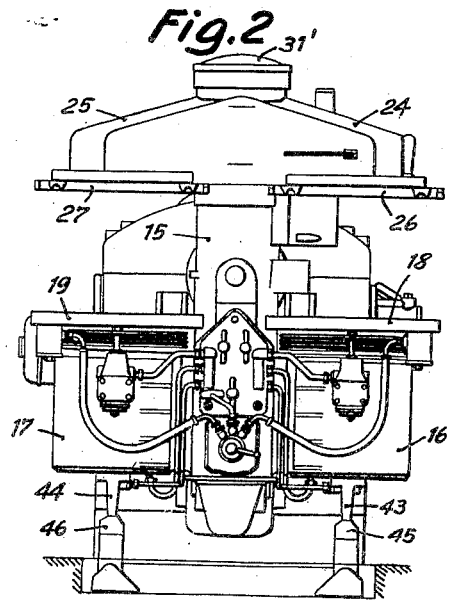
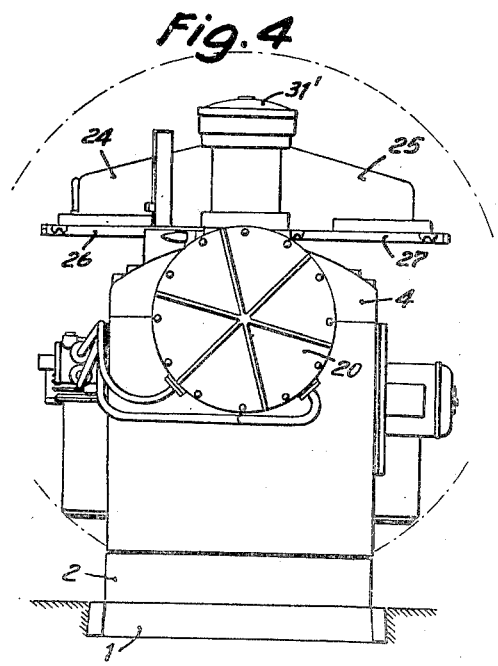
INVENTOR.
BY Eduard Mezger

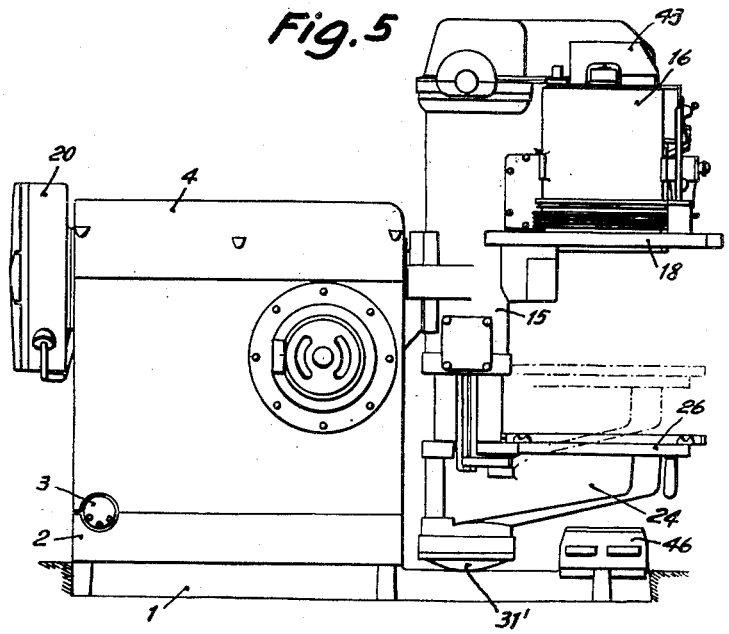

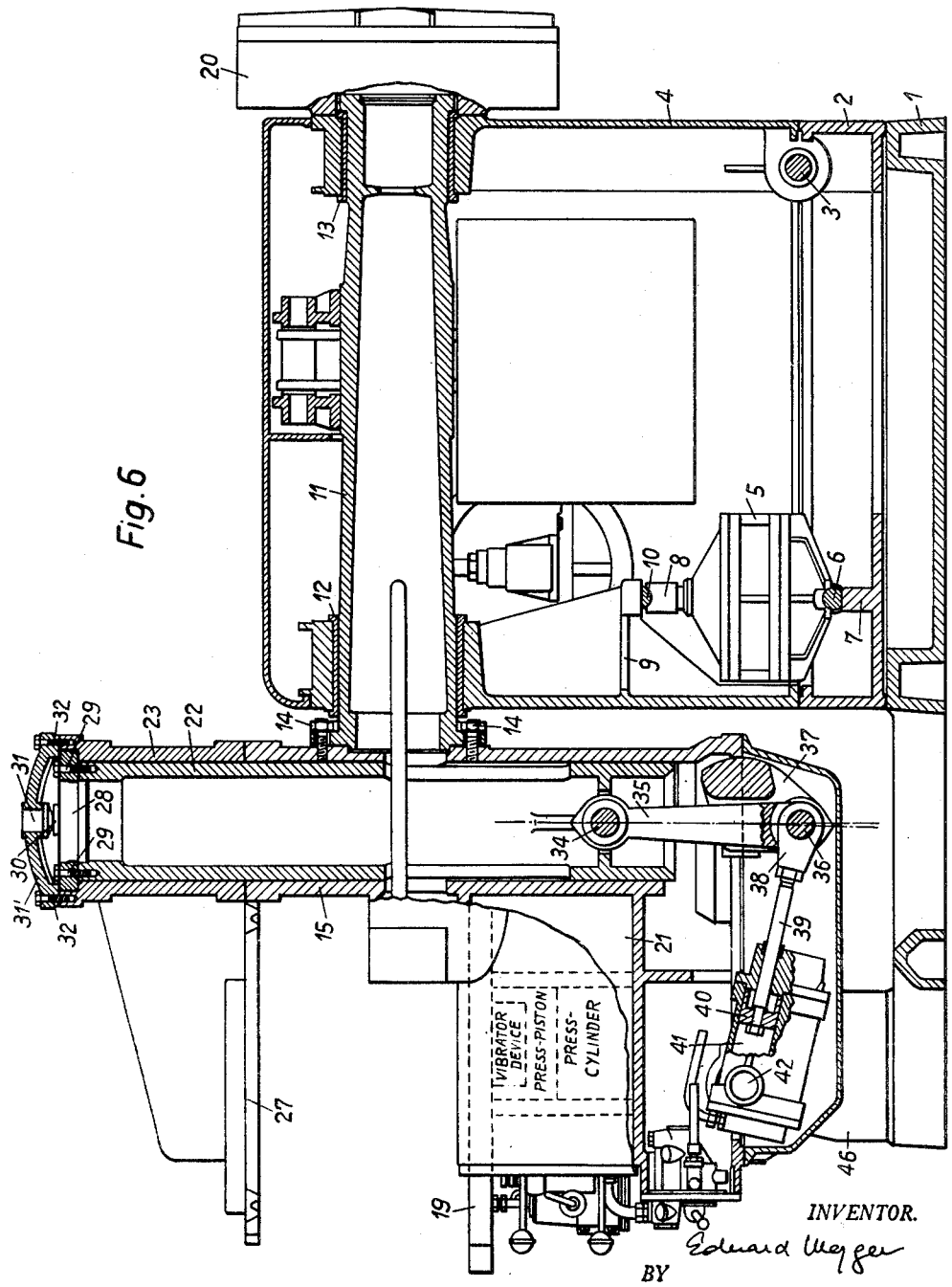

Patented Sept. 22, 1953

2,652,608

UNITED STATES PATENT OFFICE 2,652,608

VIBRATION MOLDING MACHINE

Eduard Mezger, Kallnach, Switzerland

Application January 10, 1950, Serial No. 137,801
In Switzerland January 17, 1949

4 Claims. (Cl. 22—32)

The invention relates to a vibration moulding machine of the type wherein the pattern plate is attached on the top of the table plate of a vibrating and pressing device the casing of which is carried cantilever fashion at the free end of a horizontal axle which is journalled for rotation about itself whereby the vibrating and pressing device can be reversed 180° for the purpose of taking off the finished mould.

It is the principal object of the invention to provide a vibration moulding machine of the kind referred to wherein the said vibrating and pressing device is supported in a stable manner both during vibrating and pressing, and during reversing.

It is another object of the invention to provide a vibration moulding machine of the kind referred to wherein the bearings in which the said horizontal axle is journalled are protected from excessive wear caused by undue loading owing to the cantilever fashion carriage of the vibrating and pressing device.

It is a further object of the invention to provide a machine of the kind referred to which is accurate in operation and produces work of uniformly high quality.

It is a still further object of the invention to provide a machine of the kind referred to which is capable of carrying two independent vibrating and pressing devices as claimed in my copending patent application Ser. No. 137,802, filed January 10, 1950.

Further objects of the invention will appear from the description of a typical embodiment thereof later in this specification.

According to a main feature of the invention I arrange the said horizontal axle for rotation about itself and for being moved relative to the base of the machine in a vertical direction and I provide a lifting device for said axle and the vibrating and pressing device attached thereon, which latter during vibrating and pressing firmly rests on the said base, whereby said vibrating and pressing device is lifted off the said base so as to clear the latter when being reversed by rotating the said axle 180°.

With these general statements of objects and purposes of my invention I will now proceed to describe an embodiment thereof and the manner in which my invention is carried out, and it will be understood that while I have described what may be considered as a preferable embodiment of my invention, I do not limit myself to the precise conditions or proportions herein set forth, as they may be varied by those skilled in the art in accordance with the particular purposes for which they are intended and the conditions under which they are utilized.

Figure 3:
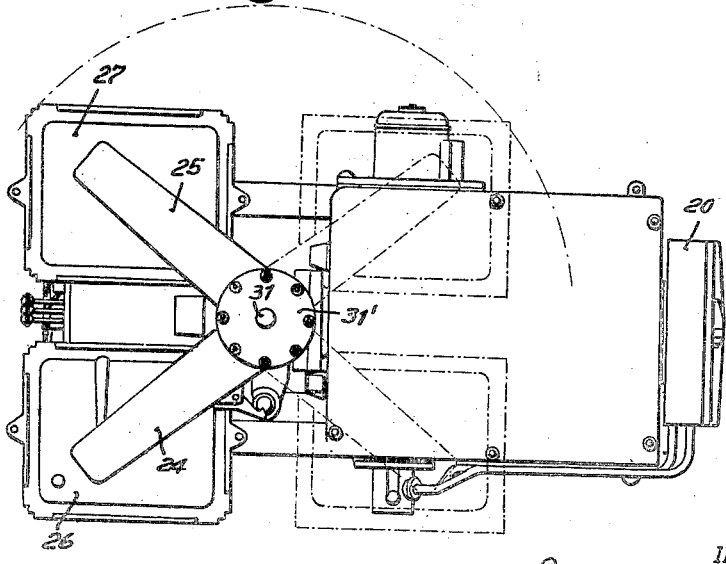

In the accompanying drawings:

Fig. 1 is a side elevation of a typical embodiment of a vibration moulding machine according to the invention as viewed from one side, Fig. 2 is a front elevation thereof, Fig. 3 is a plan view thereof, Fig. 4 is a rear elevation thereof, Fig. 5 is a side elevation of this vibration moulding machine with the vibrating and pressing device reversed, as viewed from the other side, Fig. 6 is a section along the line A—A of Fig. 2 on a larger scale.

On a base plate 1 the bottom part 2 of a box shaped upright of the machine is rigidly attached. On a horizontal axle 3 arranged in the bottom part 2 near the rear wall thereof and parallel to it, the upper part 4 of the upright of the machine is tiltably pivoted. In the frontal portion of the box shaped upright of the machine a lifting cylinder 5 is arranged (see Fig. 6) which has a cylindrical bearing surface which contacts with a cylindrical bearing piece 6 which rests on a support 7 in the bottom part 2. In the lifting cylinder 5 slides a piston the piston rod of which has a head piece 8 with a cylindrical bearing surface. This head piece 8 acts on an angle bracket 9 arranged on the upper part 4 which is provided with a cylindrical bearing piece 10. The circular-cylindrical bearing pieces and bearing surfaces allow the lifting cylinder 5 to adjust itself so that merely compressive forces are transmitted in any position. In the upper portion of the upper part 4 a horizontal axle 11 is journalled in sleeves 12 and 13 perpendicular to the axle 3. On the front end thereof which projects from the upper part 4 a part of the casing is attached by means of screws 14 the rear portion 15 of which forms a cylindrical guide perpendicular to the axle 11. The lower portion of this part of the casing, jutting out forward, forms the casings 16 and 17 (see Figs. 1, 2 and 3) of two pneumatic press cylinders (not shown in the drawing) in the press pistons of which the likewise pneumatic vibrator devices are arranged concentrically. On the press pistons or rather on the vibrator devices of the casings 16, 17 table plates 18, 19 respectively, are arranged.

On the rear end of the axle 11 projecting from the upper part 4 in a casing 20 attached to the upper part 4 a hydraulic reversing gear is arranged by means of which the axle 11 can be turned 180° with all the components attached to it. In a chamber 21 (Fig. 6) provided between the casings 16 and 17, the control members of the two independently controllable vibrator and pressing devices as well as those of the lifting cylinder 5 and of the reversing gear are arranged, and on the front plate of this chamber 21 the control levers required are arranged.

In the guide (Fig. 6) provided in the rear portion 15 of the part of the casing perpendicular to the axle 11 a hollow beam 22 is arranged to be axially shiftable. On the portion of this beam 22 that projects beyond the guide, the guide member 23 of a two-armed cantilever is rotatably arranged, the two arms of which, 24, 25 (Figs. 2, 3, 4), carry press plates 26 and 27, respectively. The arms 24 and 25 of the cantilever stand at such an angle with respect to one another that their press plates 26 and 27 lie accurately above the table plates 18 and 19 when the cantilever is turned into the appropriate position. On the upper end of the beam 22 a circular plate 28 (Fig. 6) having a larger diameter than the latter is attached by means of screws 29, which plate lies in an enlargement of the guide portion 23. This plate 28 has on top in the middle an abutment 30 on which bears the head of a pin 31 which has a spherical surface and is inserted in the lid 31' which lid is attached by means of screws 32 on to the guide portion 23. In this manner the guide portion 23 is secured against being axially shifted with respect to the beam 22.

In the lower portion of the beam 22 a gudgeon pin 34 is journalled to which a connecting rod 35 is attached the other end of which is journalled on the crank pin 36 of a crank 37 journalled in the lower portion at this part of the casing. The crank pin 36 is also engaged by the head 38 of a piston rod 39 attached to a piston 40 which is shiftable in a hydraulic cylinder 41 under the action of a liquid pressure medium. The cylinder 41 is tiltably pivoted on an axle 42. The control members for the pressure medium which moves the piston 40 with the piston rod 39 are arranged in the lower portion of this part of the casing, and its operating members are arranged on the front plate of this part.

On the bottom of each of the casings 16 and 17 (Fig. 2) this part of the casing has a foot 43 and 44, respectively, and on the base plate 1 two bearing brackets 45, 46 are rigidly attached on which the feet 43 and 44 rest firmly in that position of the machine in which the filling-in of the sand, the vibrating and the pressing is effected.

For the purpose of filling-in the sand into the parts of the moulding box attached to the table plates 18 and 19, and of vibrating them, the vibratory moulding machine described is in the position represented in Figs. 1 and 2, while the cantilever with its two arms 24 and 25 may be turned into the position indicated in Fig. 3 in chain dotted lines. After the vibrating the sand contained in the moulding box parts is yet to be pressed since its uppermost layer has not been sufficiently solidified merely by the vibrating. For this purpose the table plates 18 and 19 with the pattern plates and mould box parts arranged on them are lifted by means of the pressing cylinders and are pressed against the press plates 26 and 27. The beam 22 on which the cantilever with its arms 24 and 25 and their press plates 26 and 27 is attached, is then in the position represented in Fig. 6. The position of the press plates 26 and 27 is then fixed so that the crank pin 36 of the crank 37 has slightly passed its dead centre while the piston in the cylinder 41 is in its terminal position. After the pressing, reversing is effected for the purpose of lifting the moulding box parts from the pattern plates, i. e. the axle 11 is turned 180° (Fig. 5) with all components attached to it. For this purpose the upper part 4 of the upright of the machine is lifted up by means of the lifting cylinder 5, and is turned about the axle 3. Thereby also the part of the casing attached to the front end of the axle 11 is lifted until the feet 43 and 44 arranged below the casings 16 and 17 are sufficiently lifted off from the supporting brackets 45 and 46.

Thereafter the axle 11 can be turned 180° by means of the reversing gear arranged in the casing 20. The lifting of the pattern plates attached to the table plates 18 and 19 from the mould box parts, which for this purpose rest on the press plates 26 and 27 is effected by shifting the beam 22 in its guide by means of the piston 41, shiftable in the cylinder 40, through the piston rod 39 and its head 38, the crank pin 36 of the crank 37, and the connecting rod 35. If desired the return stroke of the pistons of the press cylinders arranged in the casings 16 and 17 can be used for increasing the amount of lift.

The vibratory moulding machine could alternatively be so designed that the upper part of the box shaped upright of the machine wherein the axle is journalled about which the reversing is effected, is not tilted about an axle, but is shifted in a vertical direction by means of a preferably hydraulic lifting device in a guide provided on the stationary part of the upright of the machine.

What I claim as my invention and desire to secure by Letters Patent, is:

1. A vibration molding machine comprising, in combination, a base member for the entire machine; a vibration and pressure table adapted to have a mold prepared thereon; and a casing in which said table is movably mounted so that said casing remains stationary while the table is vibrated and moved for compressing the sand in the mold, said casing having a portion thereof which rests on said base member during the vibration and pressure operations of said table; an elongated shaft connected to said casing and having an axis which is substantially parallel to said table; bearing means located over said base and rotatably supporting said shaft; pivot means interconnecting said bearing means and base member for pivotally mounting said bearing means on said base member, said pivot means having an axis which is substantially perpendicular to said shaft axis; tilting means operatively connected to said bearing means for turning the same about said pivot means so as to tilt said shaft and raise said casing connected thereto to a distance which permits said casing to be rotated about said shaft axis without being obstructed by said base member, said tilting means being located on said base between said casing and said pivotal mounting means; and means for rotating said shaft through 180° after it has been raised by said raising means.

2. A vibration molding machine comprising, in combination, a base member for the entire machine; a vibration and pressure table adapted to have a mold prepared thereon; and a casing in which said table is movably mounted so that said casing remains stationary while the table is vibrated and moved for compressing the sand in the mold, said casing having a portion thereof which rests on said base member during the vibration and pressure operations of said table; an elongated shaft connected to said casing and having an axis which is substantially parallel to said table; bearing means located over said base and rotatably supporting said shaft; pivot means interconnecting said bearing means and base member for pivotally mounting said bearing means on said base member, said pivot means having an axis which is substantially perpendicular to said shaft axis; means for tilting said bearing means about said pivotal mounting means so as to tilt said shaft and raise said casing connected thereto to a distance which permits said casing to be rotated about said shaft axis without being obstructed by said base member, said tilting means being located on said base between said casing and said pivotal mounting means and comprising hydraulic cylinder and piston members one of which is in contact with said base member and the other of which is in contact with said bearing means; means for connecting said cylinder and piston members to said base member and bearing means, respectively, comprising spherical bearing surfaces on said cylinder and piston members which are located in contact with mating spherical bearing surfaces on said base member and bearing means, respectively, whereby only compressive forces are transmitted to said tilting means; and means for rotating said shaft through 180° after it has been raised by said raising means.

3. A vibration molding machine comprising, in combination, a base for the entire machine; casing means having a vibration and pressure table mounted thereon, said casing means being movably mounted on said base for movement between one position where said casing means bears against said base and another position where said casing means is spaced from said base; moving means operatively connected to said casing means for moving the same from said one position to said other position; and turning means operatively connected to said casing means for inverting the same when said casing means is in said other position thereof.

4. A vibration molding machine comprising, in combination, a base for the entire machine; casing means having a foot portion and having a vibration and pressure table mounted thereon, said casing means being pivotally mounted on said base for tilting movement between one position where said foot portion of said casing means bears against said base and another position where said foot portion of said casing means is spaced from said base; tilting means operatively connected to said casing means for tilting the same from said one position to said other position; and turning means operatively connected to said casing means for inverting the same when said casing means is in said other position thereof.

EDUARD MEZGER.

References Cited in the file of this patent

UNITED STATES PATENTS

| Number | Name | Date |
| --- | --- | --- |
| 1,447,300 | Grimes | Mar. 6, 1923 |
| 1,803,406 | Ringle | May 5, 1931 |
| 1,890,933 | Bullock | Dec. 13, 1932 |
| 1,910,354 | Nicholls | May 23, 1933 |
| 2,309,271 | Osbrink | Jan. 26, 1943 |

FOREIGN PATENTS

| Number | Country | Date |
| --- | --- | --- |
| 683,479 | Germany | Nov. 9, 1939 |